US010726616B2

(12) United States Patent
Ryde et al.

(10) Patent No.: US 10,726,616 B2
(45) Date of Patent: Jul. 28, 2020

(54) SYSTEM AND METHOD FOR PROCESSING CAPTURED IMAGES

(71) Applicant: Rosemount Aerospace Inc., Burnsville, MN (US)

(72) Inventors: Julian C. Ryde, Alameda, CA (US); Xuchu Ding, Manchester, CT (US)

(73) Assignee: ROSEMOUNT AEROSPACE INC., Burnsville, MN (US)

(*) Notice: Subject to any disclaimer, the term of this patent is extended or adjusted under 35 U.S.C. 154(b) by 0 days.

(21) Appl. No.: 16/680,775

(22) Filed: Nov. 12, 2019

(65) Prior Publication Data
US 2020/0082616 A1    Mar. 12, 2020

Related U.S. Application Data

(63) Continuation of application No. 15/735,658, filed as application No. PCT/US2015/036145 on Jun. 17, 2015, now Pat. No. 10,489,971.

(51) Int. Cl.
G06T 17/05 (2011.01)
G06T 7/521 (2017.01)
G06T 19/20 (2011.01)
G06T 15/40 (2011.01)
G05D 1/02 (2020.01)
G05D 1/10 (2006.01)

(52) U.S. Cl.
CPC ............ G06T 17/05 (2013.01); G06T 7/521 (2017.01); G06T 15/405 (2013.01); G06T 19/20 (2013.01); G05D 1/0231 (2013.01); G05D 1/101 (2013.01); G06T 2200/08 (2013.01); G06T 2200/28 (2013.01); G06T 2207/10028 (2013.01); G06T 2219/2021 (2013.01)

(58) Field of Classification Search
None
See application file for complete search history.

(56) References Cited

U.S. PATENT DOCUMENTS 6,750,873 B1    6/2004 Bernardini et al.
8,209,143 B1    6/2012 Anguelov et al.
(Continued)

FOREIGN PATENT DOCUMENTS

WO    2013029675    3/2013

OTHER PUBLICATIONS

EP Application No. 15733038.2 Office Action dated Jul. 11, 2019, 4 pages.
(Continued)

Primary Examiner — Jason A Pringle-Parker
(74) Attorney, Agent, or Firm — Cantor Colburn LLP

(57) ABSTRACT

An image processing system configured to process perceived images of an environment includes a central processing unit (CPU) including a memory storage device having stored thereon a computer model of the environment, at least one sensor configured and disposed to capture a perceived environment including at least one of visual images of the environment and range data to objects in the environment, and a rendering unit (RU) configured and disposed to render the computer model of the environment forming a rendered model of the environment. The image processing system compares the rendered model of the environment to the perceived environment to update the computer model of the environment.

14 Claims, 2 Drawing Sheets

(56) References Cited

U.S. PATENT DOCUMENTS

| | | | |
|---|---|---|---|
| 8,401,225 | B2 | 3/2013 | Newcombe et al. |
| 8,587,583 | B2 | 11/2013 | Newcombe et al. |
| 9,019,268 | B1 | 4/2015 | Kuffner, Jr. et al. |
| 9,102,055 | B1 | 8/2015 | Konolige et al. |
| 9,727,971 | B2 | 8/2017 | Qiao et al. |
| 2004/0158355 | A1 | 8/2004 | Holmqvist et al. |
| 2007/0065002 | A1 | 3/2007 | Marzell et al. |
| 2010/0111444 | A1 | 5/2010 | Coffman |
| 2011/0255746 | A1 | 10/2011 | Berkovich et al. |
| 2011/0279697 | A1 | 11/2011 | Shingu et al. |
| 2012/0293635 | A1* | 11/2012 | Sharma .............. G06T 7/73 348/50 |
| 2012/0303336 | A1 | 11/2012 | Becker et al. |
| 2012/0306876 | A1 | 12/2012 | Shotton et al. |
| 2013/0124148 | A1 | 5/2013 | Jin et al. |
| 2013/0182114 | A1 | 7/2013 | Zhang et al. |
| 2014/0244114 | A1* | 8/2014 | Matsubara .......... G05D 1/024 701/41 |
| 2015/0243047 | A1 | 8/2015 | Haglund et al. |
| 2018/0365890 | A1 | 12/2018 | Ryde et al. |

OTHER PUBLICATIONS

EP Application No. 15733038.2 Office Action dated Nov. 22, 2018, 5 pages.

International Application No. PCT/US2015/036145 International Search Report and Written Opinion dated Feb. 22, 2016, 14 pages.

P. Henry, et al., "RGB-D mapping: Using Kinect-style depth cameras for dense 3D modeing of indoor environments," The International Journal of Robotics Research, vol. 31, No. 5, Feb. 10, 2012, pp. 647-663.

R. Benjemaa, et al., "Fast global registration of 3D sampled surfaces using a multi-z-buffer technique" Appeared in Proceedings of 3-D Digital Imaging and Modelling, Ottawa, May 1997, 8 pp.

R.A. Newcombe, et al., "KinectFusion: Real-time dense surface mapping and tracking," Mixed and Augmented Reality (ISMAR), 2011 10th IEEE International Symposium ON, IEEE, Oct. 26, 2011, pp. 127-136.

\* cited by examiner

SYSTEM AND METHOD FOR PROCESSING CAPTURED IMAGES

CROSS REFERENCE TO RELATED APPLICATIONS

This application is a continuation of U.S. patent application Ser. No. 15/735,658 filed Dec. 12, 2017, which application is a National Stage application of PCT/US2015/036145, filed Jun. 17, 2015, the disclosures of which are incorporated herein by reference in their entirety.

BACKGROUND OF THE DISCLOSURE

Exemplary embodiments pertain to the art of sensor processing and, more particularly to a system and method for processing captured images.

Moving platforms such as robots, drones, and the like, includes sensors that provide environmental feedback. Sensors may include visual sensors, such as cameras, and range sensors that may detect an object or a distance to an object. The moving platform may include autonomous control that relies on the sensors for navigation. When under autonomous control, the moving platform often times includes a map that facilitates various capabilities such as obstacle avoidance, path planning, place, and object recognition.

BRIEF DESCRIPTION OF THE DISCLOSURE

Disclosed is an image processing system configured to process perceived images of an environment including a central processing unit (CPU) including a memory storage device having stored thereon a computer model of the environment, at least one sensor configured and disposed to capture a perceived environment including at least one of visual images of the environment and range data to objects in the environment, and a rendering unit (RU) configured and disposed to render the computer model of the environment forming a rendered model of the environment. The image processing system compares the rendered model of the environment to the perceived environment to update the computer model of the environment.

In addition to one or more of the features described above or below, or as an alternative, further embodiments could include wherein the at least one sensor comprises a red, green, blue, and distance (RGBD) device.

In addition to one or more of the features described above or below, or as an alternative, further embodiments could include wherein the at least one sensor comprises a first sensor configured to capture visual images of the environment, and a second sensor configured to determine range to objects in the environment.

In addition to one or more of the features described above or below, or as an alternative, further embodiments could include wherein the first sensor comprises a camera.

In addition to one or more of the features described above or below, or as an alternative, further embodiments could include wherein the second sensor comprises a LiDAR sensor.

In addition to one or more of the features described above or below, or as an alternative, further embodiments could include wherein the RU comprises a graphics processing unit (GPU).

Also disclosed is a system for processing images captured by a moving platform. The system includes a central processing unit (CPU), said CPU being interconnected functionally via a system bus to at least one sensor configured and disposed to capture a perceived environment including at least one of visual images of the environment and a range data to objects in the environment, a rendering unit (RU), and at least one memory device thereupon stored a computer model of the environment and a set of instructions which, when executed by said CPU, causes the image processing system to capture a perceived environment through the at least one sensor, the perceived environment including visual images and range data, render the computer model of the environment in the RU forming a rendered model of the environment, compare the rendered model of the environment with the perceived environment, and selectively update the computer model of the environment based on the perceived environment.

In addition to one or more of the features described above or below, or as an alternative, further embodiments could include wherein the set of instructions which, when executed by said CPU, causes the image processing system to employ an iterative process to compute a position and orientation of the moving platform by performing a Z-buffer optimization of the perceived environment.

In addition to one or more of the features described above or below, or as an alternative, further embodiments could include the set of instructions which, when executed by said CPU, causes the image processing system to perform a direct numerical optimization on a per-point error metric of the Z-buffer optimization.

In addition to one or more of the features described above or below, or as an alternative, further embodiments could include wherein the set of instructions which, when executed by said CPU, causes the image processing system to employ an iterative process to compute a position and orientation of the moving platform by performing an iterative closest point (ICP) optimization against the computer model of the environment.

In addition to one or more of the features described above or below, or as an alternative, further embodiments could include wherein the ICP optimization includes a point-to-point optimization of the perceived environment.

In addition to one or more of the features described above or below, or as an alternative, further embodiments could include wherein the ICP optimization includes a point-to-plane optimization of the perceived environment.

In addition to one or more of the features described above or below, or as an alternative, further embodiments could include wherein the set of instructions which, when executed by said CPU, causes the image processing system to form at least one of a plurality of points, voxels, and textured polygon meshes that embody the perceived environment.

In addition to one or more of the features described above or below, or as an alternative, further embodiments could include wherein each of the at least one of the plurality of points, voxels, and textured polygon meshes includes geographical positioning system (GPS) coordinates.

BRIEF DESCRIPTION OF THE DRAWINGS

The following descriptions should not be considered limiting in any way. With reference to the accompanying drawings, like elements are numbered alike.

DETAILED DESCRIPTION OF THE DISCLOSURE

A detailed description of one or more embodiments of the disclosed apparatus and method are presented herein by way of exemplification and not limitation with reference to the Figures.

Figure 1:
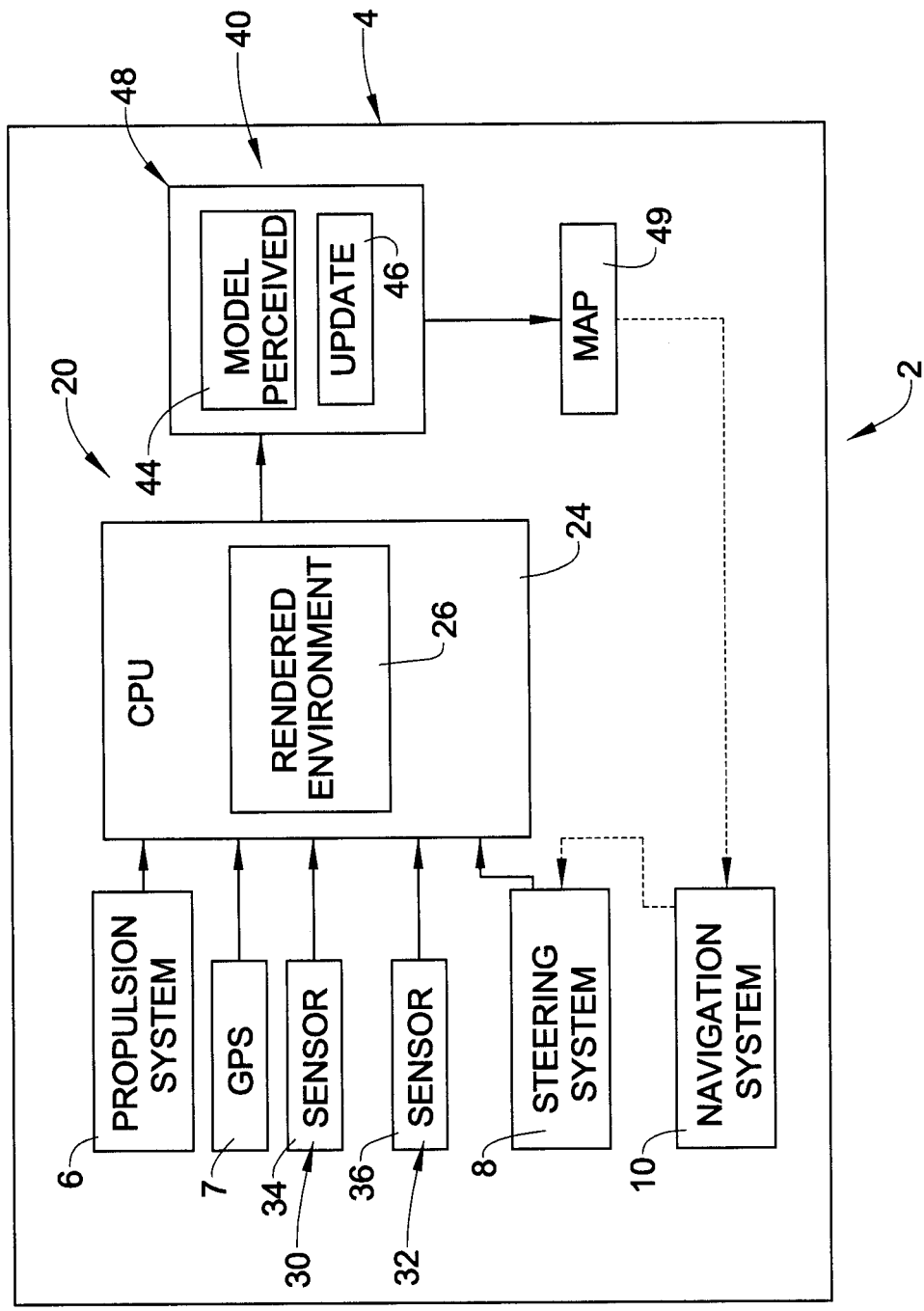
FIG. 1 is block diagram illustrating a moving platform having an image processing system, in accordance with an exemplary embodiment.

A moving platform system, in accordance with an exemplary embodiment, is illustrated generally at 2, in FIG. 1. Moving platform system 2 may take the form of a ground based platform system, such as a robot, or a human and/or animal, and/or an air based platform such as an unmanned aerial vehicle or drone. Moving platform system 2 includes a platform 4 that may support a propulsion system 6, a global positioning system (GPS) 7, a steering system 8 that guides platform 4 through an environment, and a navigation system 10. Navigation system 10 may be coupled to steering system 6 to direct platform 4 along a desired course through the environment. In this manner, moving platform system 2 may be configured for autonomous control. At this point, it should be understood that platform 4 may also be constructed without the use of a GPS system.

In accordance with an exemplary embodiment, moving platform system 2 includes an image processing system 20 which, as will be discussed more fully below, processes images of the environment perceived by sensors mounted to platform 4. Image processing system 20 includes a central processing unit (CPU) 24 that may include a memory storage device 26 having stored thereon a computer model of the environment and/or hypothetical model of the environment. The computer model of the environment may comprise voxels, points, and/or a textured polygon mesh. Image processing system 20 may be operatively connected to a first sensor 30 and a second sensor 32. First sensor 30 captures visual images of the environment and may take the form of a digital video camera, a red, green, blue, and distance (RGBD) device or other similar device that may produce, simultaneously, a depth image superimposed on a colored visual image, as indicated at 34. At this point, it should be understood that the term "visual images" should be understood to include multi-dimensional images that include a depth component. Second sensor 32 may be a range sensor, such as a LiDAR sensor 36 that determines distances between platform 4 and various objects in the environment.

In further accordance with an exemplary embodiment, image processing system 20 includes a rendering unit (RU) 40 that may include a modeling module 44 and an update module 46. As will be detailed more fully below, RU 40 may take the form of a Graphics Processing Unit (GPU) 48. Image processing system 20 leverages higher speeds and increased computing power of GPU in addition to embedded graphics processing algorithms over that typically available through a general purpose GPU (GPGPU) technique or methodology to create an occupancy map or a rendered model of environment. More specifically, RU 40 receives, as input, the computer model of the environment and outputs a rendered model of the environment. The rendered model of the environment may include a plurality of grids that may include code indicating one of a presence and an absence of objects, as well as additional data such as color and/or depth. The rendered model of the environment is then compared with sensor data embodying the perceived environment.

For example, modeling module 44 of GPU 48 may employ iterative closest point (ICP) techniques to align visual images with depth or distance data captured by one or more of sensors 30 and 32. The increased computing power and flexibility of GPU 48 may substantially instantly compare incoming data with the computer rendering including polygon surfaces, colored by surface normal to corresponding points and their normals. Update module 46 compares the rendered model of the environment with the data from sensors 30 and/or 32 to determine whether differences exist. If differences do exist, GPU 48 may output an updated computer model of the environment 49 that may be passed to navigation system 10 and/or stored for later use. Update module 46 may also update a position and orientation of platform 4 within the model of the perceived environment. Of course, it should be understood, that image processing system 20 may be arranged remote from platform 4 and may be provided with captured data in order to model the perceived environment.

Figure 2:
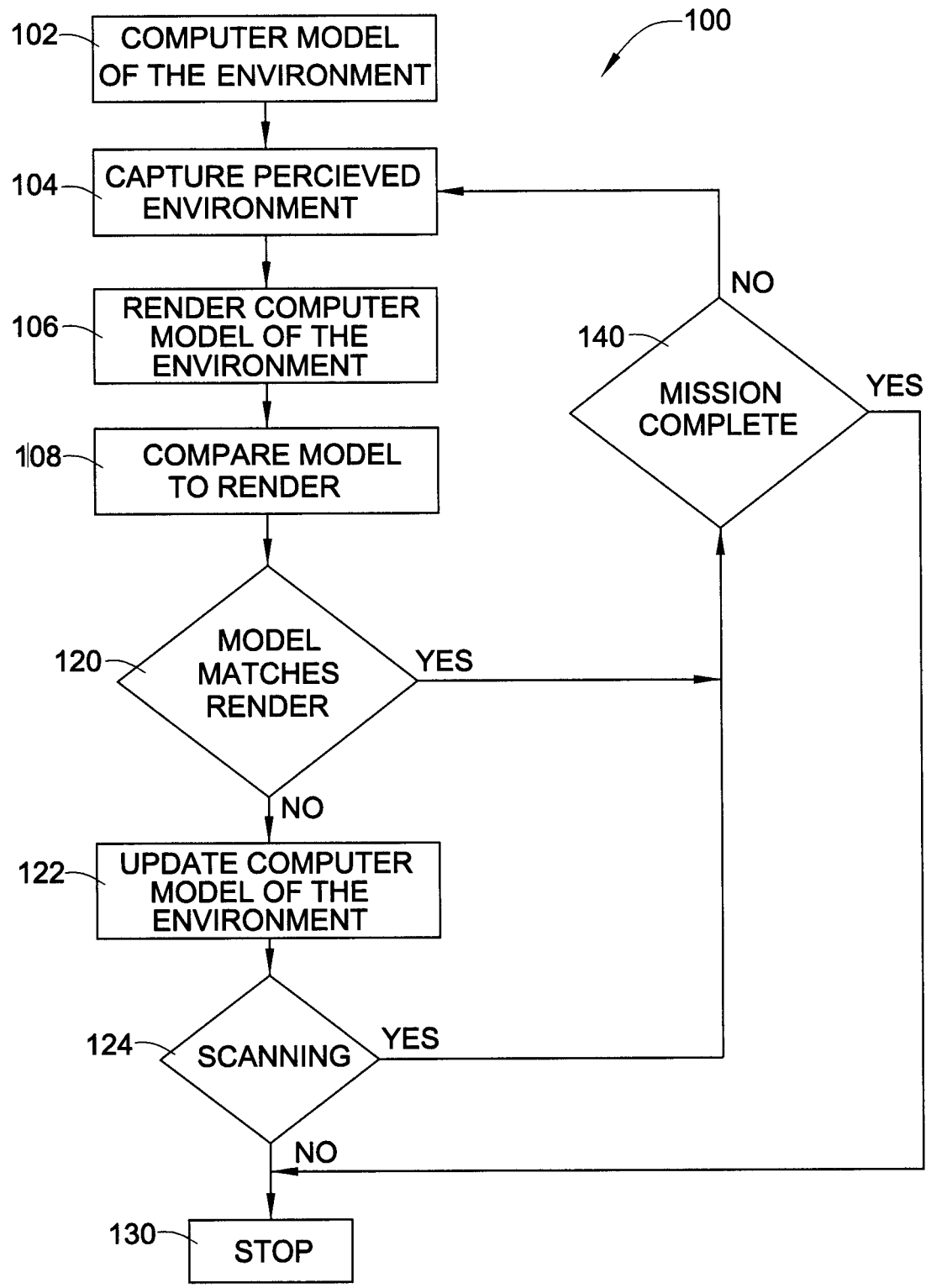
FIG. 2 is a flow diagram illustrating a method of processing images, in accordance with an exemplary embodiment.

Reference will now follow to FIG. 2 in describing a method 100 for processing images through image processing system 20, in accordance with an exemplary embodiment. A computer model of the environment comprising voxels, pixels, points, and/or a textured polygon mesh is created in block 102. The computer model of the environment may be based on existing data, satellite images, photographs, other captured images, hypothetical data, and the like. The perceived environment is captured in block 104. The perceived environment may be captured through one or more of sensors 30 and 32. The perceived environment may be captured and saved as visual images and depth data. After capturing the perceived environment, RU 40 updates the computer model of the environment by adding information from the perceived environment into the model, including voxels, pixels and/or a textured polygon mesh in block 106. RU 40 may employ a variety of image processing techniques to render the computer model.

In accordance with an aspect of an exemplary embodiment, a position and orientation or pose of platform 4 may be computed by an iterative process, in which starting with a hypothesis of the position and orientation of the platform, the rendered model of the environment may be created at the hypothetical pose, to be compared with the actual perceived environment captured through sensor data including images and/or range. Any differences between the rendered model of the environment and the actual view of the environment may be employed to gauge accuracy of the hypothesis, and to compute a correction with respect to the current hypothesis to update the computer model of the environment. This process may be repeated until any differences between the rendered model of the environment and the actual view of the environment is sufficiently small, at which point the hypothetical pose is considered to be accurate to the current position and orientation of platform 4.

In accordance with another aspect of an exemplary embodiment, RU 40 may perform a Z-buffer optimization of the perceived environment. Further, modeling module 44 may perform a direct numerical optimization on a per-point error metric of the Z-buffer optimization. In accordance with another aspect of an exemplary embodiment, modeling module 44 may perform an iterative closest point (ICP) optimization of the perceived environment. The ICP optimization may include a point-to-point optimization of the perceived environment and/or a point-to-plane optimization of the perceived environment. Further, modeling module 44 may embed global positioning (GPS) coordinates or Inertial Navigation Unit (INU) measurement, and depth coordinated in each point of the perceived environment.

In block 108, the perceived environment is compared with the rendered model of the environment. In block 120, a determination is made whether the perceived environment matches the rendered model of the environment. If discrepancies are found, the rendered computer model of the environment is updated to reflect actual perceived conditions of the environment in block 122. In this manner, the computer model of the environment may be updated to account for any changes that are found by image processing system 20. In block 124, a determination is made whether additional scanning of the environment takes place. If not, image processing system 20 ends in block 130. If additional scanning takes place, and/or the rendered model of the environment matches the perceived environment, a determination is made in block 140 whether the mission is complete. If not, sensors 30 and/or 32 continue capturing the perceived environment in block 104. If the mission is deemed to be completed, image processing ends in block 130.

At this point, it should be understood that the exemplary embodiments leverage increased computing technology with enhanced speed of a GPU to process images and normals to surfaces in the images to form a model of a perceived environment. The model of the perceived environment may be used to update existing computer renderings of the environment to enhance navigation and/or route planning for autonomous moving platforms. Further, it should be understood that modern GPUs may be used to render an environment at a very high rate. As such, the use of GPUs in connection with the exemplary embodiments may enhance speed and/or efficiency of updating the rendered model of the environment. Still further, it should be understood that the iterative process could be formally modeled as an optimization procedure in which differences between the model of the rendered environment and the actual view of the environment may be set as a cost function, and an unconstrained optimization method can be used to iteratively compute the position and orientation that would result in reducing this cost function.

In accordance with another aspect of an exemplary embodiment, RU 40 may not update the computer model of the environment by adding information from the perceived environment, but instead may construct an environment from idealized information. For example, RU 40 may render the color surfaces according to a direction of a surface normal. In this manner, surface normals may be determined from their color, which could result in faster determinations from rendered images. It should be understood that although in such an instance, where surfaces were colored to indicate the direction of surface normal, surface shape in the internal model would still match the perceived environment even through the color may be different.

In accordance with other aspects of an exemplary embodiment the internal model would not necessarily match the perceived environment; rather the rendered model may be generated to an environment that does not have a corresponding physical 3D meaning but would support a render based computation in the rendered environment. For example, the model may be generated in such a way so as to provide collision detection for grasping, audio wave form analysis, or path planning in two dimensions. Thus, the rendered 3D model may be rendered by RU 40 to solve a specific spatial problem rather than to match an actual perceived environment.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system for processing images captured by a moving platform comprising a steering system and a navigation system, the system comprising:
    a central processing unit (CPU), said CPU being interconnected functionally via a system bus to:
    at least one sensor configured and disposed to capture a perceived environment including at least one of visual images of the environment and range data to objects in the environment;
    a graphics processing unit (GPU); and
    at least one memory device thereupon stored a computer model of the environment and a set of instructions which, when executed by said CPU, causes the image processing system to:
        capture a perceived environment through the at least one sensor, the perceived environment including visual images and range data;
        render the computer model of the environment in the GPU forming a rendered model of the environment using image processing, the rendered model comprising a plurality of grids indicating one of a presence and an absence of the objects;
        compare the rendered model of the environment with the perceived environment;
        selectively update the computer model of the environment based on the perceived environment;
        employ an iterative process to compute a position and orientation of the moving platform by performing an optimization of the perceived environment against the computer model of the environment, wherein the optimization comprises a direct numerical optimization on a per-point error metric; and
        provide the computer model to the navigation system to control the steering system to direct the moving platform through the environment.

2. The system of claim 1, wherein the set of instructions which, when executed by said CPU, causes the image processing system to: form at least one of a plurality of points, voxels, and textured polygon meshes that embody the perceived environment.

3. The system of claim 2, wherein each of the at least one of the plurality of points, voxels, and textured polygon meshes includes geographical positioning system (GPS) coordinates.

4. The system of claim 1, wherein the at least one sensor comprises a red, green, blue, and distance (RGBD) device.

5. The system of claim 1, wherein the at least one sensor comprises a first sensor configured to capture visual images of the environment, and a second sensor configured to determine range to objects in the environment.

6. The system according to claim 5, wherein the first sensor comprises a camera.

7. The system according to claim 5, wherein the second sensor comprises a LiDAR sensor.

8. A system for processing images captured by a moving platform comprising a steering system and a navigation system, the system comprising:
- a central processing unit (CPU), said CPU being interconnected functionally via a system bus to:
- at least one sensor configured and disposed to capture a perceived environment including at least one of visual images of the environment and range data to objects in the environment;
- a graphics processing unit (GPU); and
- at least one memory device thereupon stored a computer model of the environment and a set of instructions which, when executed by said CPU, causes the image processing system to:
  - capture a perceived environment through the at least one sensor, the perceived environment including visual images and range data;
  - render the computer model of the environment in the GPU forming a rendered model of the environment using image processing, the rendered model comprising a plurality of grids indicating one of a presence and an absence of the objects;
  - selectively update the computer model of the environment based on the perceived environment;
  - employ an iterative process to compute a position and orientation of the moving platform by performing an iterative closest point (ICP) optimization against the computer model of the environment, wherein the ICP optimization includes a point-to-point optimization or a point-to-plane optimization of the perceived environment; and
  - provide the computer model to the navigation system to control the steering system to direct the moving platform through the environment.

9. The system of claim 8, wherein the set of instructions which, when executed by said CPU, causes the image processing system to: form at least one of a plurality of points, voxels, and textured polygon meshes that embody the perceived environment.

10. The system of claim 9, wherein each of the at least one of the plurality of points, voxels, and textured polygon meshes includes geographical positioning system (GPS) coordinates.

11. The system of claim 8, wherein the at least one sensor comprises a red, green, blue, and distance (RGBD) device.

12. The system of claim 8, wherein the at least one sensor comprises a first sensor configured to capture visual images of the environment, and a second sensor configured to determine range to objects in the environment.

13. The system according to claim 12, wherein the first sensor comprises a camera.

14. The system according to claim 12, wherein the second sensor comprises a LiDAR sensor.

* * * * *